(12) United States Patent
Schupp

(10) Patent No.: US 6,766,707 B2
(45) Date of Patent: Jul. 27, 2004

(54) SHAFT CLUTCH

(75) Inventor: Carsten Schupp, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/278,331

(22) Filed: Oct. 23, 2002

(65) Prior Publication Data
US 2003/0074993 A1 Apr. 24, 2003

(30) Foreign Application Priority Data
Oct. 23, 2001 (DE) .......................... 101 52 185

(51) Int. Cl.$^7$ .......................... F16H 3/38; B60K 20/00
(52) U.S. Cl. .................... 74/339; 192/114 T; 74/473.36
(58) Field of Search ................... 192/114 R, 114 T; 74/473.36, 339, 45.7

(56) References Cited

U.S. PATENT DOCUMENTS 2,070,140 A    2/1937 Peterson et al.
5,085,303 A  * 2/1992 Frost ..................... 192/53.32
5,626,213 A  * 5/1997 Janiszewski ............ 192/53.4
5,957,257 A  * 9/1999 Nellums ................. 192/53.31

FOREIGN PATENT DOCUMENTS

| AT | 196248    | 7/1957  |
| CH | 295875    | 1/1954  |
| DE | 1 936 017 | 1/1970  |
| DE | 3 939 274 | 10/1991 |
| DE | 198 31 981| 7/1998  |
| JP | 073 323 87| 12/1995 |

* cited by examiner

Primary Examiner—Tisha D Lewis
(74) Attorney, Agent, or Firm—Collard & Roe, P.C.

(57) ABSTRACT

A shaft clutch which may be designed as a dog clutch. In order to save axial construction space, the two end regions of the dog clutch are utilized for the transmission of torque from the shaft to the motor vehicle transmission member to be coupled. The middle region between the two end regions has solely the function of axial fixing during torque transmission and can be made correspondingly short axially.

6 Claims, 4 Drawing Sheets

SHAFT CLUTCH

CROSS REFERENCE TO RELATED APPLICATIONS

Application claims priority under 35 U.S.C. §119 of GERMAN Application No. 101 52 85.5 filed on Oct. 23, 2001.

BACKGROUND

The invention relates to a shaft clutch for the alternate positive connection of one of two motor vehicle transmission members to a shaft.

Such a shaft clutch is already known from DE 198 31 981 A1. This shaft clutch is designed as a dog clutch and has a shift sleeve with shift dogs. The shift sleeve is displaceable axially in two directions with respect to its longitudinal axis or axis of rotation. In the respective axial end position, that is to say in the engaged state, the said shift dogs of the shift sleeve make a rotationally fixed connection between the shaft and a motor vehicle transmission member. For this purpose, the motor vehicle transmission member has a shift toothing matching the shift dogs. In order to prevent a gear jump, both the shift dogs and the shift toothing are lined. This lining has the effect that, when torque is transmitted from the shaft to the motor vehicle transmission member, the circumferential force results in an axial force component which pulls the shift sleeve onto the shift toothing or holds the shift sleeve in this position. During this torque transmission, the circumferential support of the shift dogs takes place, on the one hand, on a guide toothing of the shift-sleeve carrier and, on the other hand, on the shift toothing of the motor vehicle transmission member to be coupled.

SUMMARY

The object of the invention is to provide an axially short shaft clutch for the alternate positive connection of two motor vehicle transmission members.

The invention relates to a shaft clutch which may be designed as a dog clutch. In order to save axial construction space, the two end regions of the dog clutch are utilized for the transmission of torque from the shaft to the motor vehicle transmission member to be coupled. The middle region between the two end regions has solely the function of axial fixing during torque transmission and can be made correspondingly short axially.

One advantage of the invention is that the entire shaft clutch has an axially short build. This is achieved in that the two end regions of the dog clutch are utilized for the transmission of torque from the shaft to the motor vehicle transmission member to be coupled. By contrast, a middle region between the two end regions has the function of axial fixing during torque transmission and can be made correspondingly short axially. In particular, the axially middle region may be shorter than the two end regions. Furthermore, the axially middle region may advantageously have the function of the axial guidance of the shift sleeve in the non-torque transmitting state or in the neutral position.

According to a further advantage of the invention, a lining of the end regions of the shift dogs and of the two shift toothings which is complicated in manufacturing terms is not necessary. This is accompanied by cost benefits.

In this context, a refinement of the shift dogs is particularly cost-effective to manufacture and in which the flanks of the shift dogs are parallel to the longitudinal axis of the shaft clutch.

An advantageous development of the invention permits relatively reliable axial securing of the shaft clutch in the engaged state, a relatively easy shift of the shaft clutch back into the neutral position nevertheless being made possible.

Further advantages of the invention may be gathered from the further subclaims, the description and the drawing.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
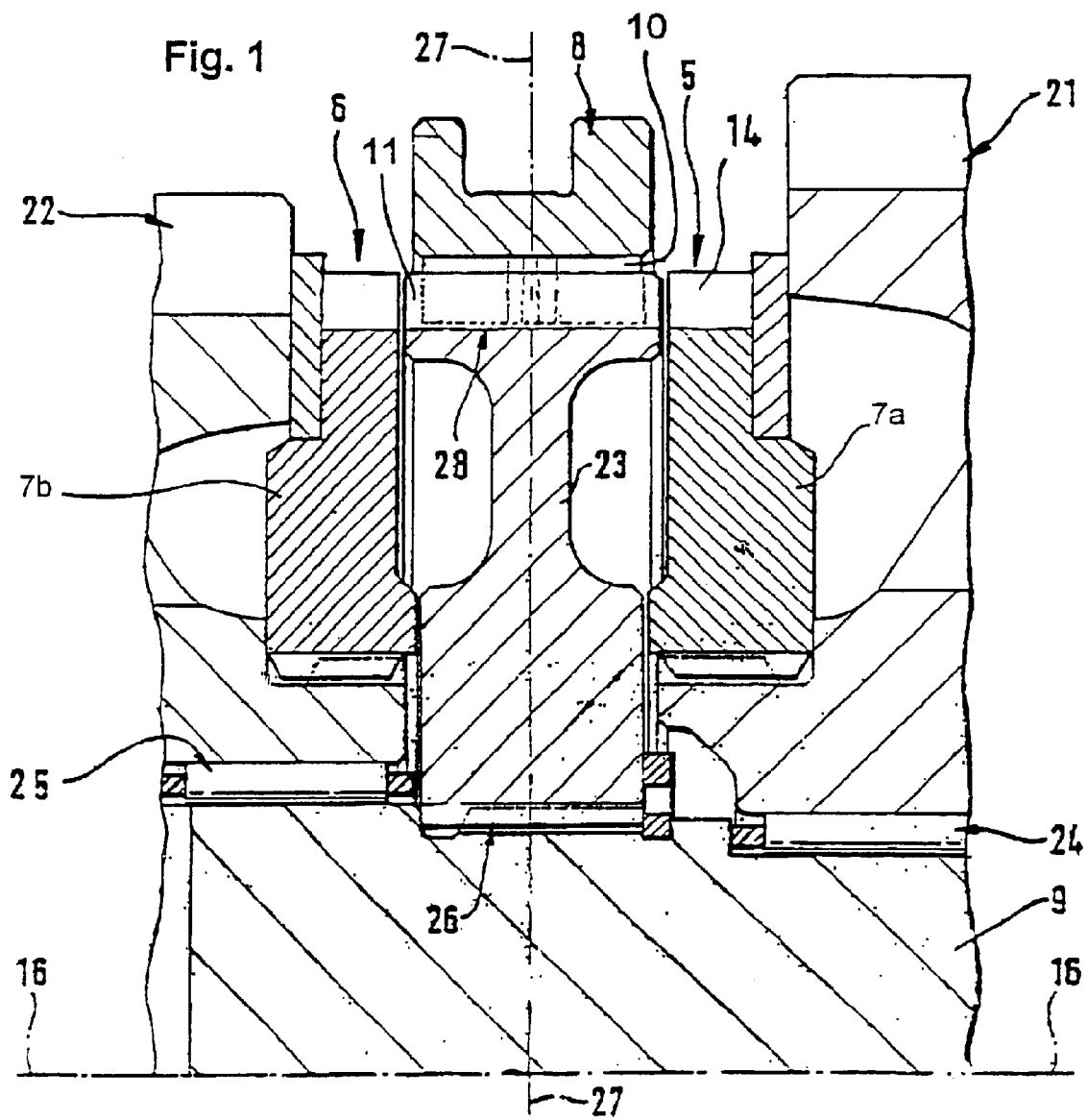
FIG. 1 shows a first exemplary embodiment of a shaft clutch for the alternate positive connection of one of two gearwheels, a shift sleeve being in a neutral position.

FIG. 1 shows a shaft clutch for the alternate positive connection of one of two gearwheels 21 and 22, a shift sleeve 8 being in a neutral position.

Two gearwheels 21 and 22 and also an annular shift-sleeve carrier 23 are arranged on a shaft 9 of a variable-speed gear transmission, not illustrated in any more detail, concentrically and axially non-displaceably with respect to a geometric axis of rotation or clutch axis 16 of two dog clutches 5 and 6.

Whilst gearwheels 21 and 22 are supported on shaft 9 in each case by means of a radial needle bearing 24 and 25, a conventional axial drive toothing 26 is used for the rotationally fixed connection between shaft 9 and shift-sleeve carrier 23. Dog clutches 5 and 6 are used for the selective coupling of gearwheels 21 and 22 to shaft 9, are designed identically and are arranged mirror-symmetrically or symmetrically to a mid-plane 27 of shift-sleeve carrier 23, the said mid-plane being perpendicular to the axis of rotation. Annular shift sleeve 8 is arranged with respect to shift-sleeve carrier 23 concentrically and, by means of a further axial drive toothing 28, fixedly in terms of rotation and axially displaceably, shift sleeve 8 forming in the usual way the clutch half, assigned in each case to shaft 9, of two dog clutches 5 and 6, of which only dog clutch 5 will be described further in terms of its configuration and mode of operation. In this case, shift sleeve 8 is axially displaceable by means of an actuator which is not illustrated in any more detail.

Drive toothing 28 is composed of axial shift dogs 10 on the inner circumference of shift sleeve 8 and of axial guide teeth 11 on the outer circumference of shift-sleeve carrier 23, guide teeth 11 are arranged in relation to clutch axis 16 with the same radius as a shift toothing 14, assigned fixedly in terms of movement to gearwheel 21, has in relation to clutch axis 16. Shift toothing 14 is formed on the outer circumference of an annular clutch half 7a of two clutch halves 7a, 7b. Clutch half 7a is arranged concentrically to clutch axis 16 and fixedly in terms of movement in relation to gearwheel 21.

Figure 1A:
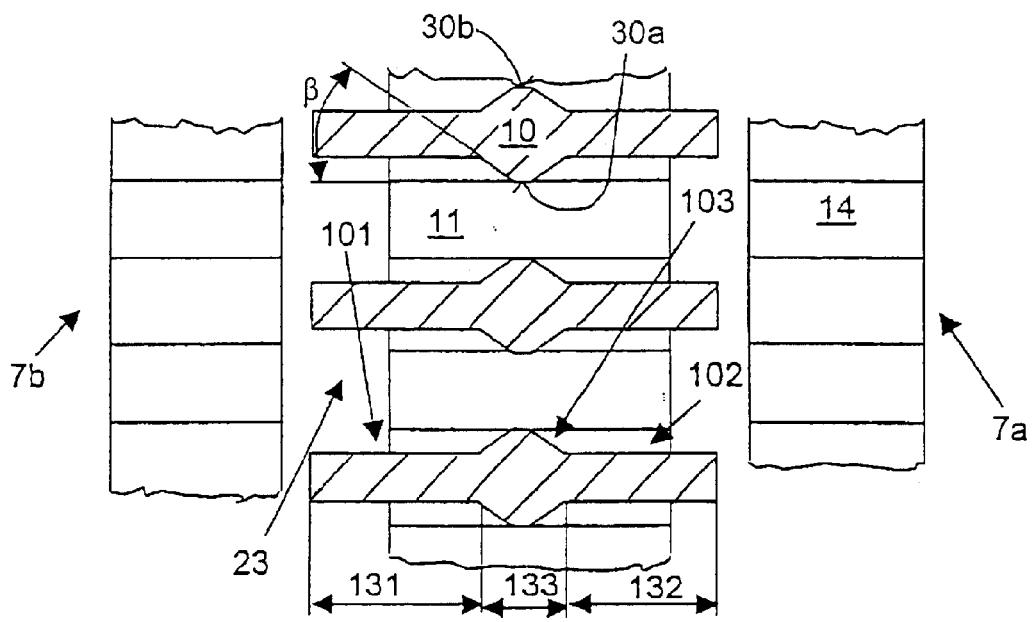
FIG. 1a shows a section through shift dogs of the shift sleeve from FIG. 1 in a laid-out view, the shift dogs of the shift sleeve being in a neutral position.

FIG. 1a shows a section through shift dogs 10 of shift sleeve 8 from FIG. 1 in a laid-out view, shift dogs 10 and shift sleeve 8 being in a neutral position.

Shift dogs 10 are guided axially in the tooth interspaces of guide toothing 11 of shift-sleeve carrier 23. Clutch half 7a arranged rotatably in relation to shift-sleeve carrier 23 is illustrated in a rotary-angle position which makes it possible to engage shift dogs 10 on shift toothing 14 without previous abutment.

Shift dogs 10 are designed identically in their axial end regions 101, 102. Both the tooth flanks of end regions 101, 102 and shift toothing 14 extend parallel to clutch axis 16 which is evident in FIG. 1. Furthermore, shift dogs 10 have on their axially middle region 103, on both sides, circumferential protuberances which form a bulged thickening of each individual shift dog 10.

Both an axial length 131 of end region 101 and an axial length 132 of end region 102 exceed an axial length 133 of middle region 103.

The circumferentially outmost regions of these protuberances are arranged axially centrally and form axial guide flanks 30a, 30b which have slight play with respect to guide toothing 11 or bear over a large area on guide toothing 11. The axial guide flanks have adjoining them slopes which merge into two axial end regions 101, 102. The angles β of these slopes are optimized and have an angle β of 10°. This angle β is formed between the respective axial guide flank and the tooth flank of respective end region 101 or 102. It applies, in general terms, that steep slopes or large angles β must be selected for axially short overall lengths and high return forces, that is to say forces which, after unintended displacement, pull the shift sleeve back again into the torque-transmitting position illustrated in FIG. 1b. Conversely, the slopes selected must be as flat as possible or the angles β selected must be as small as possible for low adjusting forces which are to be applied.

Figure 1B:
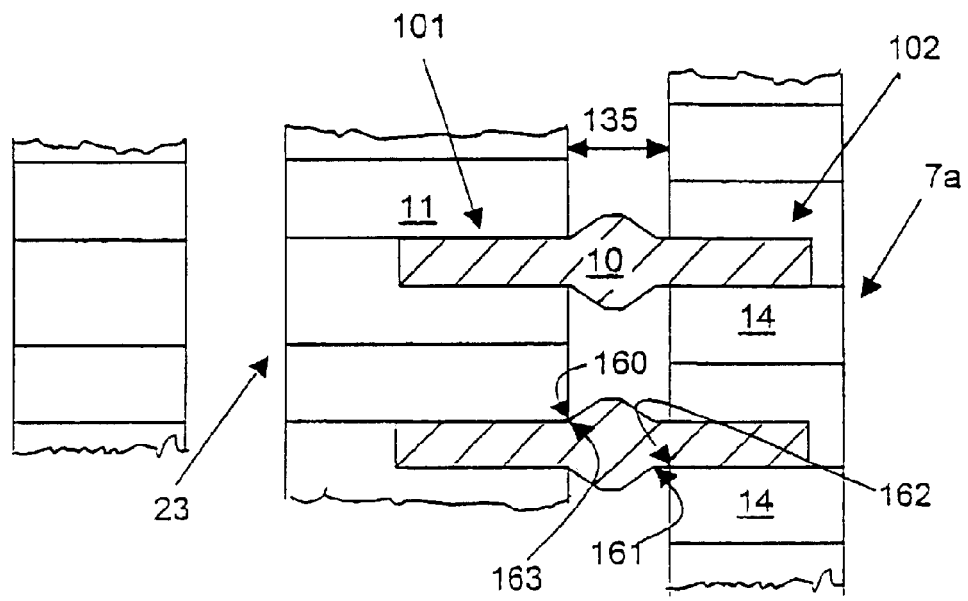
FIG. 1b shows a section according to FIG. 1a, the shift dogs of the shift sleeve transmitting a torque from a shaft to one gearwheel.

FIG. 1b shows a section according to FIG. 1a, shift dogs 10 of shift sleeve 8 being displaced in the direction pointing towards gearwheel 21 or clutch half 7a, and at the same time transmitting a torque from shaft 9 to clutch half 7a or to one gearwheel 21 connected to the latter. Clutch half 7a is in this case rotated slightly with respect to shift-sleeve carrier 23.

As a result of the torque transmission, one end region 101 of shift dog 10 bears with one tooth flank on guide toothing 11 over a large area. By contrast, other end region 102 of shift dog 10 bears, with its tooth flank located diagonally opposite the first tooth flank, on shift toothing 14 over a large area.

An axial clearance 135 between shift-sleeve carrier 23 and clutch half 7a is slightly greater than an axial length 133 of the protuberances, so that, in spite of tolerances as a consequence of manufacture, it is ensured that, as mentioned above, end regions 101, 102 come to bear over a large area. It is therefore not possible, even with the most unfavorable manufacturing tolerances, for the situation to arise where the slopes bear solely on one edge of guide toothing 11, on the one hand, and on one edge of shift toothing 14, on the other hand, without end regions 101, 102 coming to bear over a large area.

In the state illustrated in FIG. 1b, an edge 163 of guide toothing 11 lies at a vertex 160, corresponding to this, between the corresponding slopes and the tooth flank of end region 101. By contrast, an edge 162 of shift toothing 14 has an axial clearance with respect to a vertex 161, corresponding to this, of shift dog 10.

The axial abutment protection thus formed prevents, together with the frictional force between shift dog 10 and guide toothing 11 or shift toothing 14, the axial displacement of shift sleeve 8 during torque transmission, which is also designated as gear jump.

Figure 2A:
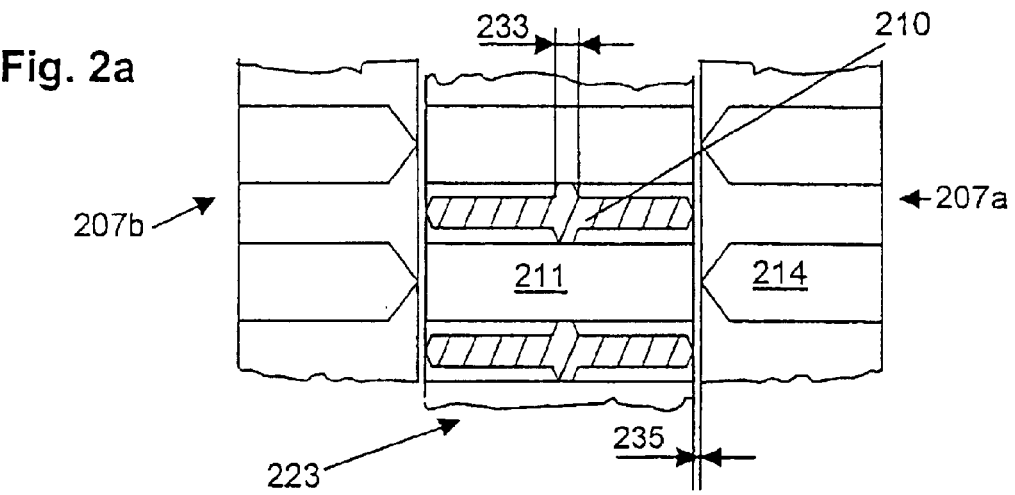
FIG. 2a shows a second exemplary embodiment of a shaft clutch in a form of illustration similar to that of FIG. 1a, the shift dogs of a shift sleeve being in a neutral position.

FIG. 2a shows a shaft clutch in a second exemplary embodiment which is optimized in terms of axial construction space and shift comfort. Shift dogs 210 of a shift sleeve, which cannot be seen in any more detail, are in a neutral position. Only the differences from the first exemplary embodiment are dealt with below.

An axial clearance 235 between a shift-sleeve carrier 223 and a clutch half 207a is shorter than an axial length 233 of middle protuberances of shift dogs 210.

Shift dogs 210 have shorter middle protuberances than shown in the first exemplary embodiment. Since the function of the protuberances in the axially middle region of shift dogs 210 in the torque-transmitting state is merely axial abutment protection, axial length 233 selected for the protuberances can be correspondingly short.

Instead of the flat end faces, shown in the first exemplary embodiment, of the shift dogs and of the shift toothing, shift dogs 210 and shift toothing 214 of the second exemplary embodiment have roof slopes for simplified "slipping-in", that is to say intermeshing.

Figure 2B:
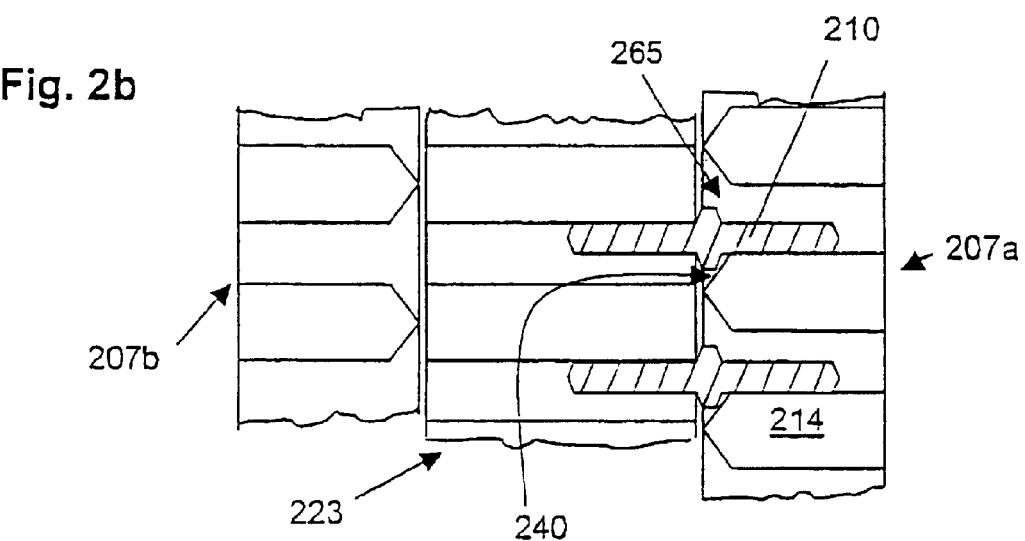
FIG. 2b shows the shaft clutch from FIG. 2a, the shift dogs of the shift sleeve transmitting a torque from a shaft to a first gearwheel.

FIG. 2b shows the shaft clutch in the torque-transmitting state similar to FIG. 1b. Since axial clearance 235 between shift-sleeve carrier 223 and clutch half 207a is shorter than axial length 233 of the middle protuberances, the middle protuberances project axially into shift toothing 214. In this case, one protuberance projects into a tooth interspace 265 of shift toothing 214, whereas the other protuberance projects into a space 240 cleared as a result of the roof slopes.

Figure 3A:
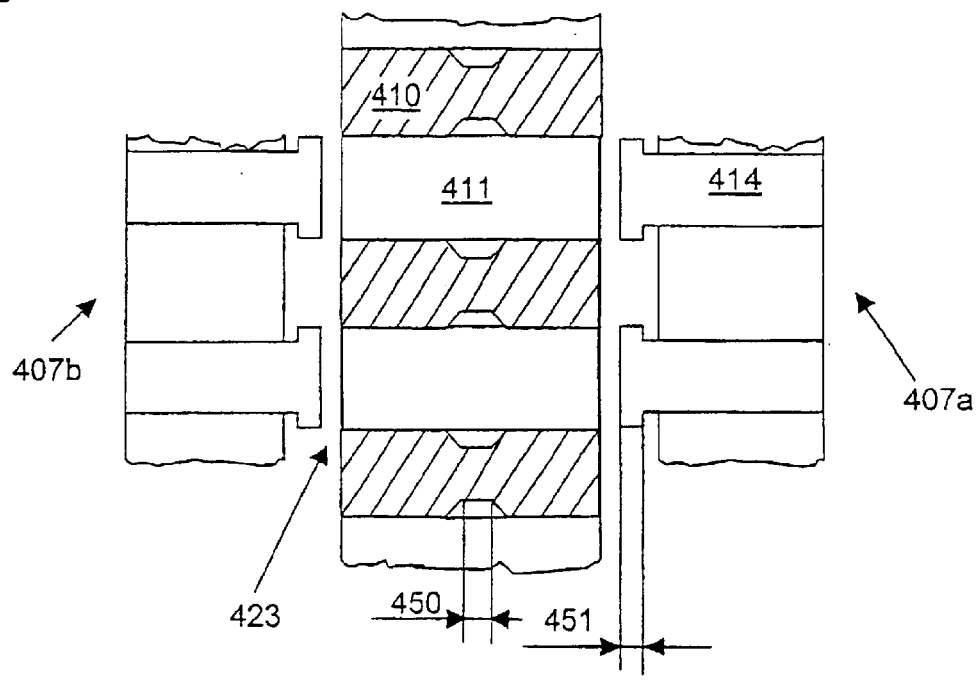
FIG. 3a shows a third exemplary embodiment of a shaft clutch in a form of illustration similar to that of FIG. 1a, the shift dogs of a shift sleeve being in a neutral position and having indentations.
Figure 3B:
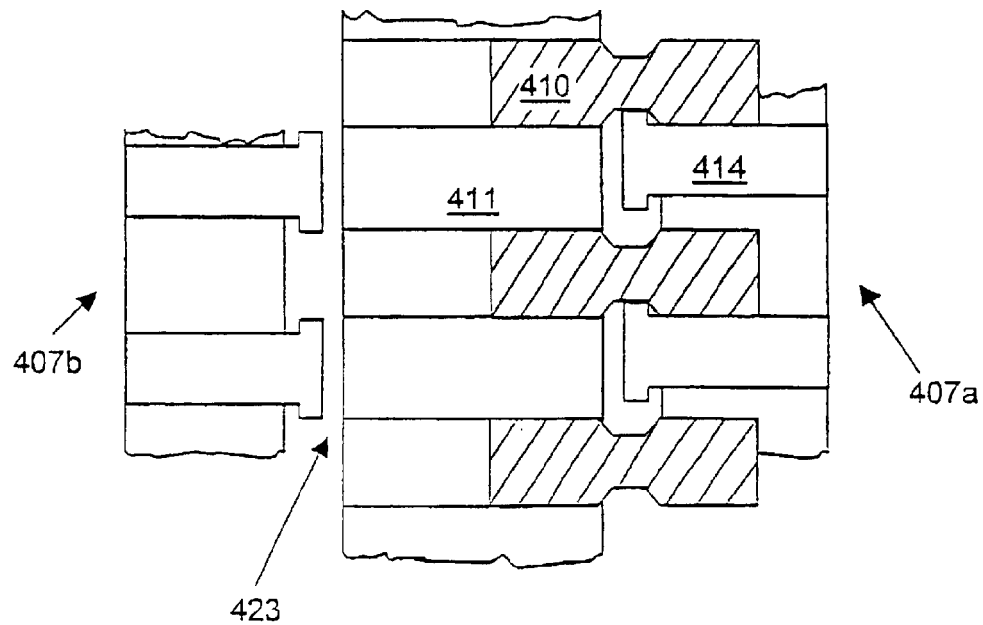
FIG. 3b shows the shaft clutch from FIG. 3a, the shift dogs of the shift sleeve transmitting a torque from a shaft to a first gearwheel.

FIG. 3a and FIG. 3b show a third exemplary embodiment of a shaft clutch in a form of illustration similar to the first two exemplary embodiments.

In contrast to the first two exemplary embodiments, the shift dogs have indentations instead of protuberances. The shift toothings are consequentially T-shaped, the upper "T" bar being oriented transversely to the clutch axis of the shaft clutch. Thus, as in the first two exemplary embodiments, in this exemplary embodiment, too, it is possible to have torque transmission safe against gear jump in both torque directions of a clutch half 407a or 407b in relation to the shaft.

The indentations are provided with slopes, so that the indentation has a trapezoidal shape. The engagement and disengagement of the shaft clutch are therefore possible without difficulty.

A length 450 of the trapezoidal indentation without its slopes is greater than a thickness 451 of the "T" bar.

In further exemplary embodiments, the protuberances or indentations may also take the form of roundings. Furthermore, roundings may be formed on the shift toothings instead of the "T" bar.

The shift dogs and/or the shift toothing according to the third exemplary embodiment may, in an alternative configuration, also have roof slopes according to the second exemplary embodiment.

The ends of the guide toothing and/or shift dogs may have, as compared with the exemplary embodiments with roof slopes or pointed ends, flattenings or roundings which reliably rule out a removal of material during the engagement of the shaft clutch.

One motor vehicle transmission member to be coupled to the shaft by the shaft clutch may, instead of a gearwheel, also be a parking lock, by means of which the shaft is secured relative to a transmission case.

Furthermore, the shaft clutch may be used in the case of synchronized shaft clutches, in the engaged state of the shaft clutch the protuberances lying axially between the synchronizing ring and the shift toothing.

The shift-sleeve carrier as shown in FIG. 1 is manufactured separately. It is also possible for the shaft toothing, which is illustrated by guide toothing 11, 211, 311, 411 in the exemplary embodiments, to be worked directly into the shaft.

The angles of the slopes between the axial guide flanks and the tooth flanks of the respective end regions may also deviate from the 10° explained.

In an alternative design, the clutch half arranged fixedly in terms of movement in relation to the gearwheel according to the first exemplary embodiment may also be in one piece with the gearwheel, so that the shift toothing is worked directly into the gearwheel.

The actuator, not illustrated in any more detail in the first exemplary embodiment, for the displacement of the shift sleeve may be a manually actuated shift fork or shift rocker. The actuator may also be a power-operated actuator of a partially or fully automated transmission.

Accordingly, while at least one embodiment of the present invention has been shown and described, it is to be understood that many changes and modifications may be made thereunto without departing from the spirit and scope of the invention as defined in the appended claims.

What is claimed is:

1. A shaft clutch with a rotational axis for alternately positively coupling one of two motor vehicle transmission members to a rotatable shaft having shaft teeth, the shaft clutch comprising:
   (a) a shift sleave rotationally fixed to the rotatable shaft end axially displaceable with respect to the shaft teeth, wherein said shift sleeve is disposed concentrically to the rotational axis of the shaft clutch;
   (b) at least one shift dog disposed on an inner circumference of said shift sleeve, wherein said at least one shift dog comprises two axial and regions and at least one axial middle region with a circumferential protuberance; and
   (c) a plurality of shift teeth rotationally fixed to the motor vehicle transmission member, wherein said at least one shift dog is intermeshed with said plurality of shift teeth;
   wherein when a torque-transmitting positive coupling between the motor vehicle transmission member and the rotatable shaft is made, one of said two axial end regions of said at least one shift dog engages said plurality of shift teeth, another of said two axial end regions of said at least one shift dog engages the shaft teeth, and said circumferential protuberance is located in an axial clerance between said plurality of shift teeth and the shaft teeth.

2. The shaft clutch according to claim 1, wherein said two axial end regions of said at least one shift dog further comprise tooth flanks extending parallel to a longitudinal axis of said at least one shift dog.

3. The shaft clutch according to claim 1, wherein an axial length of said two axial end regions is longer than an axial length of said at least one axial middle region.

4. The shaft clutch according to claim 1, wherein said circumferential protuberance has a slope which forms an angle (β) of at least approximately 10°.

5. A shaft clutch with a rotational axis for alternately positively coupling one of two motor vehicle transmission members to a rotatable shaft having shaft teeth, the shaft clutch comprising:
   (a) a shift sleeve rotationally fixed to the rotatable shaft and axially displaceable with respect to the shaft teeth, wherein said shift sleeve is disposed concentrically to the rotational axis of the shaft clutch;
   (b) at least one shift dog disposed on an inner circumference of said shift sleeve wherein said at least one shift dog comprises two axial end regions and at least one axial middle region with a circumferential protuberance; and
   (c) a plurality of shift teeth rotationally fixed to the motor vehicle transmission member, wherein said at least one shift dog is intermeshed with said plurality of shaft teeth;
   wherein when a torque-transmitting positive coupling between the motor vehicle transmission member and the rotatable shaft is made, one of said two axial end regions of said at least one shift dog engages said plurality of shift teeth, another of said two axial end regions of said at least one shift dog engages the shaft teeth, and said circumferential protuberance is located in an axial clearance between said plurality of shift teeth and the shaft teeth; and
   wherein said axial clearance has an axial length slightly greater than an axial length of said circumferential protuberance.

6. A shaft clutch with a rotational axis for alternately positively coupling one of two motor vehicle transmission members to a rotatable shaft, the shaft clutch comprising:
   (a) a shift sleeve carrier disposed concentrically and axially non-displaceably with respect to the rotational axis of the shaft clutch;
   (b) a plurality of axial drive teeth rotationally fixing said shift sleeve carrier to the rotatable shaft;
   (c) a shift sleeve disposed concentrically to said shift sleeve carrier and axially displaceably with respect to the rotational axis of the shaft clutch;
   (d) a further plurality of axial drive teeth rotationally fixing said shift sleeve to said shift sleeve carrier;

(e) at least one shift dog disposed on an inner circumference of said shift sleeve, wherein said st least one shift dog comprises two axial end regions and at least one axial middle region with a circumferential protuberance;

(f) a plurality of guide teeth rotationally fixed to an outer circumference of said sleeve carrier; and (g) a plurality of shift teeth rotationally fixed to the motor vehicle transmission member, wherein said at least one shift dog is intermeshed with said plurality of shift teeth;

wherein when a torque-transmitting positive coupling between the motor vehicle transmission member and the rotatable shaft is made, one of said two axial end regions of said at least one shift dog engages said plurality of shift teeth, another of said two axial end regions of said at least one shift dog engages said plurality of guide teeth, and said circumferential protuberance is located in an axial clearance between said plurality of shift teeth and said plurality of guide teeth.

* * * * *

UNITED STATES PATENT AND TRADEMARK OFFICE
CERTIFICATE OF CORRECTION

PATENT NO. : 6,766,707 B2
DATED : July 27, 2004
INVENTOR(S) : Schupp-1

It is certified that error appears in the above-identified patent and that said Letters Patent is hereby corrected as shown below:

Column 5,
Line 55, please change "sleave" to -- sleeve --.
Line 56, please change "end" to -- and --.
Line 61, please change "and" to -- end --.
Line 66, please change "plurility" to -- plurality --.

Column 6,
Line 9, please change "clerance" to -- clearance --.
Line 64, please change "displaceably" to -- displaceable --.

Column 7,
Line 2, please change "st" to -- at --.
Line 7, please change "said sleeve carrier" to -- said shift sleeve carrier --.

Signed and Sealed this

Seventh Day of December, 2004

JON W. DUDAS
*Director of the United States Patent and Trademark Office*